United States Patent [19]

Urano et al.

[11] 4,099,195
[45] Jul. 4, 1978

[54] CAMERA HAVING AUTOMATIC AND MANUAL EXPOSURE-TIME DETERMINATION

[75] Inventors: Fumio Urano, Omiya; Yoshio Sawada, Tokyo, both of Japan

[73] Assignee: Asahi Kogaku Kogyo Kabushiki Kaisha, Japan

[21] Appl. No.: 641,933

[22] Filed: Dec. 18, 1975

[30] Foreign Application Priority Data

Dec. 27, 1974 [JP] Japan .......................... 49-157185[U]

[51] Int. Cl.² .............................................. G03B 7/08
[52] U.S. Cl. ................................. 354/50; 354/60 R
[58] Field of Search ......... 354/50, 51, 60 R, 234–235, 354/258, 47

[56] References Cited

U.S. PATENT DOCUMENTS

| | | | |
|---|---|---|---|
| 3,657,982 | 4/1972 | Uno et al. ......................... | 354/242 |
| 3,800,304 | 3/1974 | Taguchi et al. .................... | 354/51 |
| 3,821,757 | 6/1974 | Kobori ............................. | 354/244 |
| 3,900,857 | 8/1975 | Tsujimoto ........................ | 354/50 |
| 3,990,089 | 11/1976 | Urano .............................. | 354/242 |

*Primary Examiner*—L. T. Hix
*Assistant Examiner*—William B. Perkey
*Attorney, Agent, or Firm*—Steinberg & Blake

[57] ABSTRACT

A camera which is capable of automatically determining exposure time and which is also capable of providing for manual determination of exposure time either in a manual-mechanical range of exposure times or in a mechanical-electrical range of exposure times. The automatic exposure-time determining structure includes an electromagnet which is energized when the shutter is opened and which is deenergized to bring about closing of the shutter so as to terminate an exposure. In the electrical circuitry which is connected to this electromagnet there are a pair of parallel-connected switches one of which is an automatic switch for providing for energizing of the electromagnet whenever the shutter has opened to start an exposure while the other switch is a manual switch for preventing energizing of the electromagnet only in the manual-mechanical range of exposures so that electrical energy is not needlessly consumed and the operations are not interfered with by energizing of the electromagnet during operations with manual determination of exposure in the manual-mechanical exposure time range. However, during automatic determination of exposure or during manual determination in the mechanical-electrical range the mechanical switch has no influence on the electromagnet.

9 Claims, 3 Drawing Figures

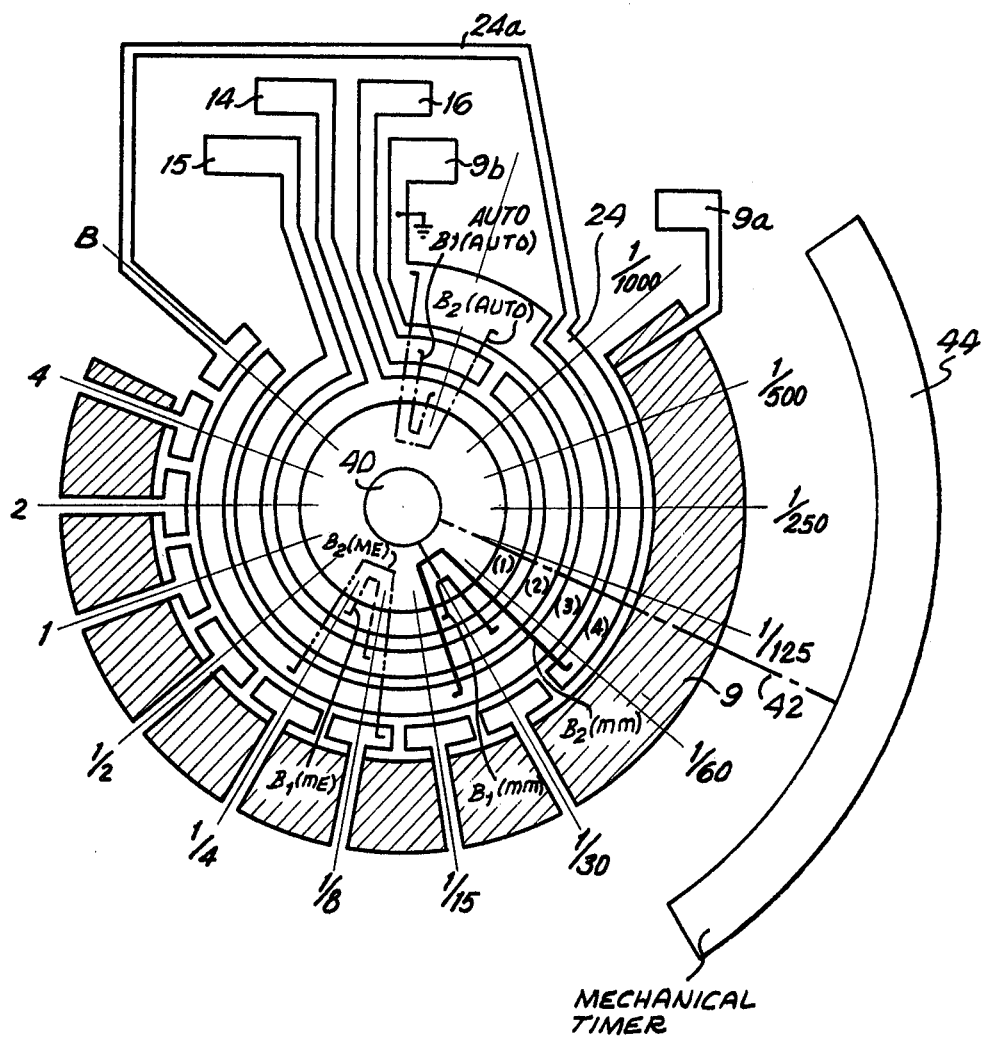

CAMERA HAVING AUTOMATIC AND MANUAL EXPOSURE-TIME DETERMINATION

BACKGROUND OF THE INVENTION

The present invention relates to cameras.

In particular, the present invention relates to cameras of the type which are adapted to provide automatic determination of exposure time but which also are capable of being operated for manual selection of exposure time either in a mechanically determined range of exposures or in an electrically determined range of exposures.

Cameras of the above type control the duration during which the shutter is maintained open in an electrical manner by utilizing an electromagnet both during purely automatic determination of exposure time as well as during manual determination of exposure time in the manual-electrical mode of operation. Thus, primarily in connection with relatively long exposure times the electromagnet is utilized even during manual determination of exposure time while purely mechanical control of exposure time by way of a suitable mechanical timer is utilized for relatively short exposure times and bulb exposures. In this latter manner, manual control of exposure time is provided by with electrical or mechanical structures. The reason for this latter arrangement is that if it should be impossible to carry out electrical controls because the operator has neglected to load the battery into the camera or because the battery power has been consumed, then the most frequently utilized relatively short exposure times can be carried out in a normal purely mechanical manner, unless, of course, the brightness of the available light is too low. Furthermore, in the case of exceedingly long exposure times such as those utilizing bulb exposures, consumption of battery power can be avoided.

With an arrangement according to which manual control of exposure time both with electrical and mechanical structures are utilized, it would be possible to avoid wasteful battery power comsumption by linking the current-source switch to the exposure time setting dial in such a way as to disconnect this switch in the range where exposure time is controlled by the purely mechanical structure. Such an arrangement would be inconvenient, however, inasmuch as with disconnection of the current-source switch in the range where exposure time is determined mechanically the structure which measures the light and indicates the extent of illumination or desirable exposure time would have its meter also rendered inoperative, so that with disconnection of the current-source switch the automatic indication of exposure time also could be rendered inoperative.

SUMMARY OF THE INVENTION

It is accordingly a primary object of the present invention to provide a highly efficient structure for controlling an electrically operable shutter in such a way that the supply of current to the electromagnet which maintains the shutter in its open position and which consumes a large part of the power which is only absolutely essential for energizing the electromagnet is utilized whereas at all other times when energizing of the electromagnet is not required, power is not wasted with unnecessary energizing of the electromagnet.

Furthermore, it is an object of the present invention to provide controls for the electromagnet which are automatically operable simply by manual selection of the type of operation desired, so that the operator will not be required to carry out special operations in connection with controlling electromagnet, and in this way forgetfulness on the part of the operator need not be contended with.

It is also an object of the present invention to provide a construction according to which the information available from the electrical light-measuring structure is maintained even during the time when the electromagnet is not energized in connection with purely mechanical exposure-time control.

Furthermore, it is an object of the present invention to provide a construction of the above type which is exceedingly simple, occupies only a small space, and which is not only efficient but also highly reliable in operation.

According to the invention the camera includes an automatic exposure-time determining means, and this latter means includes an electromagnet which is energized upon opening of the shutter and deenergized in order to terminate an exposure and thus determine the exposure time. The camera also includes a manually operable means for determining an exposure time, and thus manually operable means has a manual-mechanical range during which exposure time is determined through a purely mechanical timer or the like as well as a manual-electrical range in which the exposure time is manually selected but is electrically determined also by utilizing the above electromagnet. According to the invention, in the electrical circuitry which is connected with the electromagnet there are a pair of parallel-connected switch means one of which is an automatic switch means and the other of which is a manual switch means. The automatic switch means automatically brings about energizing of the electromagnet so that it is an energized condition whenever the shutter opens. On the other hand, the manual switch means prevents energizing of the electromagnet only when the manually operable means has placed the camera in a setting for providing manual selection of exposure time in the manual-mechanical range. In this way consumption of power by the electromagnet during this latter type of operation is avoided. At the same time, an electrical computing means and indicating means are provided in the electrical circuitry for indicating a desirable exposure time, and this computing and indicating means is maintained in the electrical circuitry independent of the manual switch means so that the latter has no influence on the computing and indicating means. Thus the latter can continue to operate to indicate a desirable exposure time even during the operation where the manually operable means sets the camera for exposures in the manual-mechanical range.

BRIEF DESCRIPTION OF DRAWINGS

The invention is illustrated by way of example in the accompanying drawings which form part of this application and in which:

FIG. 3 is a schematic illustration of part of an exposure-time setting structure forming also part of a manually operable means of the invention for selecting a particular type of operation.

DESCRIPTION OF PREFERRED EMBODIMENTS

Figure 1:
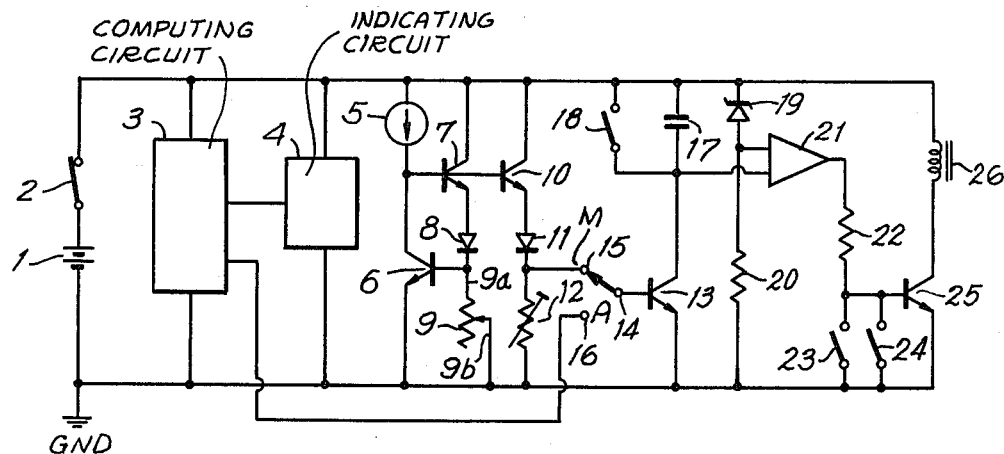
FIG. 1 is a wiring diagram of one possible embodiment of the invention.

Referring now to FIG. 1, there is illustrated in the circuit thereof a current-source battery 1 and a current-source switch 2. The latter switch is provided in order to prevent battery power consumption when the camera is not used or when the camera is used as a purely mechanically-controlled camera without employing the light-measuring circuit within the camera. The circuitry includes a computing circuit means 3 which provides for measurement of light and automatic control of exposure time, as well as an indicating circuit means 4 for indicating the results obtained by the computing circuit means 3. For example the means 3 will measure the light and will take into account such factors as film speed and diaphragm setting so as to compute the required exposure time, and the indicating means 4 will conventionally be arranged to indicate directly the exposure time calculated by the computing means 3.

The circuitry also includes a constant-current source 5 for electrically controlling the shutter when utilizing manual-exposure time controls, a transistor 6 having its collector connected to the constant-current source 5 and its base connected with a feedback circuit which includes a transistor 7 and a diode 8, and the circuitry also includes a variable resistor 9 for electrically setting the manually selected exposure time, this resistor 9 being connected between the base of the transistor 6 and a common ground line. A semi-fixed or half-fixed resistor 12 is a level-adjusting resistor for making the manually selected exposure time correspond to the exposure time set through the automatic exposure-time determining computer circuit. The circuit which includes the resistor 12 also includes a transistor 10 and a diode 11, all arranged symmetrically with the circuit which includes the resistor 9, the transistor 7 and the diode 8. Each of these circuits has a good temperature characteristic for compensating for the influence of temperature fluctuations.

A transistor 13 is included in the circuitry for providing for logarithmic expansion of the voltage which is logarithmically compressed by the transistor 7 and the diode 8 and transmitted through the transistor 10, diode 11, and switch 14 to transistor 13. The base of the transistor 13 is connected to a common terminal of the single-pole double-throw switch 14, so that through this change-over switch 14 the base of the transistor 13 is connected either with a manual exposure-time control terminal 15 or an automatic exposure-time control terminal 16, these terminals also being designated M and A, respectively in FIG. 1.

The circuitry further includes a timing switch 18 and a timing capacitor 17, the switch 18 being connected across the capacitor 17 so as to determine the starting instant of operation of a timing circuit which includes the capacitor 17 as well as the collector-to-emitter dynamic resistance of the transistor 13.

A Zener diode 19 and a resistor 20 provide a reference voltage for a switching circuit 21 the output terminal of which is connected to the base of a transistor 25 through a resistor 22.

A pair of parallel-connected switch means 23 and 24 of the invention are situated in the circuitry which controls the supply of current to the electromagnet 26. In the case of a camera which has a focal-plane shutter, the electromagnet 26 when energized will prevent the running down of the trailing curtain of the shutter after the leading curtain thereof is actuated to open the shutter, so that upon deenergizing of the electromagnet 26 the trailing curtain is released to terminate an exposure. With the illustrated circuitry, when the pair of switch means 23 and 24 are open, as long as the switching circuit 21 is not inverted, or in other words has not been triggered, the transistor 25 remains "ON" and current is supplied to the electromagnet 26 in order to maintain the latter energized. However, when the pair of switch means 23 and 24 are closed, the base of the transistor 25 is grounded so that current cannot be supplied to the electromagnet 26.

The above-described circuitry of FIG. 1 operates as follows:

Assuming that the operator has selected to provide for operation with the automatic means for determining exposure time, this operation being carried out with the current-source switch 2 closed, then the switch 14 is placed in contact with the automatic control terminal 16, the switch 24 is an in open position, and the switch 23 is in its normally closed position. The brightness of the object which is to be photographed is measured and computed by the light-measuring and computing circuit means 3, and the resulting required exposure time is indicated by the indicating means 4. On the other hand, the voltage computed by the means 3 forms the base voltage for the logarithmic expansion transistor 13, and thus, in this manner, preparation has been made for operating the shutter. Upon depression of the shutter-release plunger and in driving connection with this depressing movement, or in connection with the upward swinging movement of the mirror in a single-lens reflex camera, the switch 23 is automatically opened, so that current is supplied to the electromagnet 26. The result is that upon opening of the shutter the leading curtain will be released but the trailing curtain will be retained by the energized electromagnet 26 in a well known manner. Simultaneously with the opening of the shutter, resulting from running down of the leading curtain thereof, the timing switch 18 is automatically opened, and thus with this instant as the starting instant of the timing action, the timing capacitor 17 is charged. With the charging of the timing capacitor 17, the collector potential of the transistor 13 is gradually lowered. At the moment when this potential becomes lower than the reference voltage provided by the series circuit which includes the Zener diode 19 and the resistor 20, the output of the switching circuit 21 is inverted or triggered, so that the transistor 25 is turned "OFF", thus terminating the supply of current to the electromagnet 26, with the result that the trailing curtain is released and the shutter closes. This latter operation is carried out in a well known manner.

Assuming, however, that instead of utilizing the automatic means for determining the exposure time, the operator has elected to utilize a manual determination of exposure time, which is also carried out with the current-source switch 2 closed, when the switch 14 has been placed in contact with the manual exposure time control terminal 15, and the switch 24 is opened. Also, the brightness of the object is measured and computed by the light measuring and computing circuit 3 and the shutter speed which is most suitable to the result is indicated by the indicating circuit 4. Unlike said automatic shutter speed control operation, however, this indicated value is only a reference and the actual shutter speed is obtained as follows:

With the current $i_s$ of the constant-current source 5, the collector current $i_c$ of the transistor 6 is determined by the base-to-emitter voltage $V_{BE6}$ of the transistor 6, and a feedback is made to its base through the transistor 7, the diode 8 and the variable resistor 9 so that there is established the relation $i_c = i_s$. Under these conditions the base-to-emitter voltage $V_{BE6}$ of the transistor 6 is given by:

$$V_{BE6} = KT/q \log i_s/i_o + V_o \tag{1}$$

where $K$ is Boltzmann constant, $T$ is absolute temperature, $q$ is electron charge, $i_o$ is constant and $V_o$ is the base-to-emitter voltage of the transistor 6 when the collector current $i_c$ has the value of $i_o$. Substituting $K_6$ for $KT/q$ in the equation (1):

$$V_{BE6} = K_6 \log i_s/i_o + V_0 \tag{2}$$

Assuming that the value of the variable resistor 9 is $R_9$, the emitter current $i_7$ of the transistor 7 is given by:

$$i_7 = V_{BE6}/R_9 \tag{3}$$

The base-to-emitter voltage $V_{BE7}$ of the transistor 7 and the voltage $V_{D8}$ across the diode 8 are:

$$V_{BE7} = K_6 \log i_7/i_o + V_0 \tag{4}$$

$$V_{D8} = K_6 \log i_7/i_o + V_o \tag{5}$$

assuming that the colloector current of the transistor 13 is $i_{13}$, the base-to-emitter voltage $V_{BE13}$ of the transistor 13 is:

$$V_{BE13} = K_6 \log i_{13}/i_o + V_o \tag{6}$$

and assuming that the value of the half-fixed resistor 12 is $R_{12}$, the emitter current $i_{10}$ of the transistor 10 is:

$$i_{10} = V_{Be13}/R_{12} \tag{7}$$

Therefore, the base-to-emitter voltage VBE10 of the transistor 10 and the voltage $V_{D11}$ across the diode 11 are:

$$V_{BE10} = K_6 \log i_{10}/i_o + V_o \tag{8}$$

$$V_{D11} = K_6 \log i_{10}/i_o + V_o \tag{9}$$

In such control circuit there is established the following relation:

$$V_{BE6} + V_{BE7} + V_{BE8} = V_{BE13} + V_{BE10} + V_{D11} \tag{10}$$

Substituting the relations (2), (4), (5), (6), (8) and (9) in the relation (10), there is obtained the following relation:

$$i_{13} = (i_s \times i_7^2)/i_{10}^2 \tag{11}$$

If $i_s$ and $i_{10}$ are constant and $i_7$ is multiplied by $\rightleftarrows 2$, then the collector current $i_{13}$ of the transistor 13 serving as the timing current is multiplied by 2. Thus, if the value $R_9$ of the variable resistor 9 is varied in a series:

$$R_9 = R_o 2^{i^K} \tag{12}$$

where $R_o$ is constant, then there is obtained double variation of timing current.

The above result means that the shutter speed can be set in double variation series. When light measurement is made with the information of the diaphragm setting and film speed provided in the light-measuring computing circuit means 3, the indicating circuit means 4 will indicate the exposure time which is suitable for the particular brightness at that time of the object which is to be photographed. In the event that the exposure time is manually set, for example by a suitable dial, according to this value which is indicated by the indicating means 4, then an exposure is provided with a diaphragm-priority determination. On the other hand, if the operator has first set a selected exposure time manually and then the diaphragm is adjusted so that by rotating the diaphragm ring the indicating means 4 will indicate an exposure time equal to that which has previously been selected, then the exposure is made with an exposure-time priority determination.

Upon depressing the shutter-release plunger under either of these latter conditions, the switch 23 is opened either in driving connection with this depressing movement of the plunger or with the swinging up movement of the mirror, and current is supplied to the electromagnet 26 so that the trailing curtain is retained while the leading curtain runs down to open the shutter. When the timing switch 18 opens simultaneously with the movement of the leading shutter curtain, the timing capacitor 17 is charged, with this charging being the starting instant of the timing operation and with the collector current $i_{13}$ of the transistor 13 being as indicated by the equation (11). Then the operation is carried out in the same way as with the automatic means for determining the exposure time.

Figure 2:
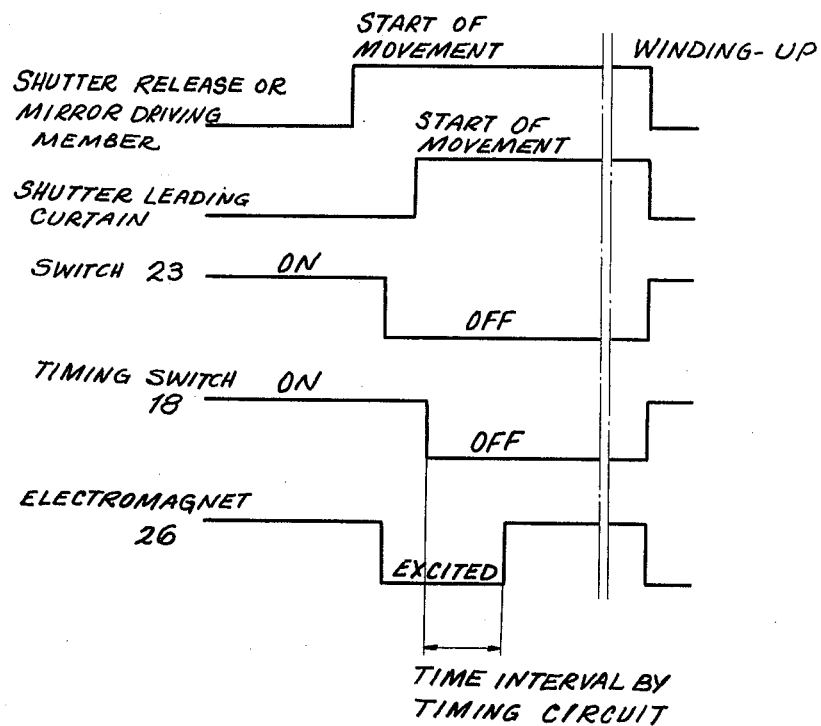
FIG. 2 is a time chart illustrating the sequence of operation of various components.

FIG. 2 illustrates a time chart of one example of the above automatic and manual-electrical exposure-time control. In the illustrated example the switch means 23, which is an automatic switch means connected in parallel with the manual switch means 24, is mechanically linked with the shutter-release mechanism or with the mirror-driving mechanism so as to be opened substantially simultaneously with opening of the shutter, the timing switch 18 also opening simultaneously with the opening of the shutter as the result of a conventional connection to the mechanism which operates the leading curtain of the shutter. Thus, it will be seen that at the upper part of FIG. 2 the start of the movement of the shutter-release or mirror-driving member is indicated with the leading curtain of the shutter being released for movement at a given time interval thereafter, while the switch 23 is turned off between these movements and the switch 18 is opened simultaneously with the starting of the movement of the leading shutter curtain. It will be seen on the other hand that the electromagnet 26 has already been energized, simultaneously with the opening of the switch 23, just prior to starting movement of the leading shutter curtain and simultaneous opening of the switch 18. Thus the electromagnet 26 will remain energized for the time interval indicated, as determined by the timing circuit, and then upon release of the trailing curtain with deenergizing of the electromagnet 26, the exposure is terminated and the winding-up of the exposed film frame and simultaneous cocking of the shutter for the next exposure will go forward as illustrated schematically in FIG. 2.

The above construction according to which the switch 23 is opened only just prior to opening of the shutter decreases the time during which current is supplied to the electromagnet 26, and in this way consumption of battery power is reduced only to the necessary minimum.

In accordance with the present invention, the manual switch means 24, connected in parallel with the automatic switch means 23, is closed at a time when the manually operable means of the invention has been placed in a position selecting manual determination of exposure time in a manual-mechanical range of exposure times. Thus, with this construction, even if the switch 23 opens automatically as a result of its driving connection with the shutter-release or mirror-driving mechanism, the base of the transistor 25 will remain grounded because the switch 24 remains closed during selection of operation in a manual-mechanical range of the manual means for determining exposure time. As a result the electromagnet 26 will not be energized when the leading curtain moves in order to open the shutter, so that unnecessary consumption of battery power by the electromagnet 26 is prevented at this time. In this case the release of the trailing curtain is determined through a conventional mechanical timer mechanism which will automatically release the trailing curtain after the manually selected exposure time in the manual-mechanical range has elapsed. On the other hand, it will be seen that with the circuitry of the invention the light-measuring computing circuit means 3 and the indicating circuit means 4 are completely independent of and totally uninfluenced by the manual switch means 24, so that these components 3 and 4 will still continue to operate as a separate exposure meter capable of indicating to the operator a proper exposure time even though there is no energizing of the electromagnet 26 at this time.

As was pointed out above, the provision of this manual switch means 24 is particularly advantageous since it results in prevention of unnecessary battery power consumption. If the switch 24 is in the form of a separate single-pull single-throw switch without any relation to the automatic-manual change-over switch 14, then separate change-over operations of these switches will create considerable inconvenience. In addition, if the operator forgets to open the switch 24, then the trailing curtain will not be retained during a subsequent selection of operation with automatic determination of exposure time, or in the case where there is a manual determination of exposure time in the manual-electrical range of exposure times. Furthermore, if the switch 24 is kept open during the manual-mechanical range of exposure times, the electromagnet 26 will be energized so that it will be impossible to carry out an accurate control of exposure time. In order to eliminate these latter drawbacks, with the arrangement of the present invention, the manual switch means 24 is operated automatically in response to adjustment of the variable resistor 9 for selecting a shutter speed, as well as in response to change-over of the automatic-manual change-over switch 14, so that the manual switch means 24 is automatically opened when the manually operable means of the invention is manipulated to select automatic control of exposure time or manual control of exposure time in a manual-electrical range of exposure times, while the switch means 24 will be automatically closed only when the operator selects the manual-mechanical range of exposure times of the manual means for determining exposure time.

FIG. 3 illustrates one example of a specific switch base plate structure of the invention which is situated within the body of the camera behind the schematically illustrated shutter dial 40 manipulated by the operator for selecting either automatic determination of exposure time, when dial 40 is turned to the illustrated AUTO position, or manual determination of exposure time when the dial 40 is turned by the operator to a selected one of a number of positions either in the manual-mechanical range occupied by the schematically illustrated mechanical timer 44 or in the manual-electrical range situated beyond the mechanical timer 44. Referring to FIG. 3 it will be seen that the structure illustrated therein includes the variable resistor 9 for setting the exposure time, as well as the automatic-manual change-over switch 14 and the switch 24. The circular portion of this switch base plate structure which is illustrated in FIG. 3 includes the electrically conductive circular strips (1), (2), (3), and (4), as well as the resistor portion of the variable resistor 9, this resistor portion being shown in hatched lines in FIG. 3. The elongated circular electrically conductive strip (1) is the common terminal for the automatic-manual change-over switch 14. It will be noted that this electrically-conductive strip 1 forms a complete circle and is permanently connected with the switch 14 as indicated in FIG. 3. Of course all of the electrically-conductive strips of FIG. 3 are insulated from each other. The circular electrically-conductive strip (2) is situated next to the innermost strip (1), but it will be noted that this circular strip (2) is interrupted so that it has an automatic portion connected with the terminal 16 and a much longer manual portion connected with the terminal 15.

This circular, interrupted electrically-conductive strip (2) is in turn surrounded by but insulated from the elongated circular electrically-conductive strip (3), this strip (3) being grounded and corresponding to the component 9b of FIG. 1. Finally, this grounded elongated strip (3) is in turn surrounded by the outermost electrically-conductive strip (4) which has an elongated portion in the manual-mechanical range connected electrically through the portion 24a with the bulb-exposure contact B. It will be noted that there is connected to the variable resistor 9 one end contact 9a for the 1/1000 second exposure time, while the successive longer exposure times up to 1/60 second represent the manual-mechanical range. Beyond but situated in a row along a circular path with the part of the strip (4) connected to the bulb terminal B are a series of additional contacts 9a which are respectively connected with different portions of the resistor 9 so as to provide different resistance values, these additional contacts 9a being provided for the several exposure times in the manual-electrical range which in the illustrated example extends between 1/30 and 4 seconds. It is to be noted that the manual-mechanical range includes the bulb exposure position B. Of course, it will be understood that the part of the contact strip (4) in the manual-mechanical range, which is connected by the conductive portion 24a to the bulb-exposure contact is connected electrically to the base of the transistor 25, while the connection of the switch 24 to ground or the disconnection thereof from ground is carried out by way of the grounded strip (3), as will be apparent from the description below.

The manually turnable exposure-time selecting dial 40 schematically shown in FIG. 3 as schematically illustrated with a pair of brushes (B1 and B2 which are schematically represented in FIG. 3 to form with these brushes a single unit available to the operator to be moved manually to a selected one of a number of different positions. Thus these brushes will turn with the knob when the latter is turned by the operator to select a given type of operation. The brushes B1 and B2 are of course insulated from each other and from the body and other conductors. The brush B1 moves along the circular paths occupied by the inner pair of conductive strips (1) and (2), while the brush B2 moves along the circular paths occupied by the strips (3) and (4).

Assuming that the operator selects to manipulate the manually operable means to provide for operation with the automatic means for determining exposure time, then the brushes B1 and B2 will have the dot-dash line position indicated in FIG. 3 where the brush B1 bridges across and interconnects that part of the strip (2) which is connected with the contact 16 to the innermost strip (1), so that in this way the switch 14 is set for automatic operation as described above in connection with FIG. 1. At this time the other brush B2 has both of its ends in engagement with the wider portion of the strip (4), so that both parts of the brush are grounded and the resistor 9 has, of course, between the terminals 9a and 9b an infinite resistance, with the switch 24 at this time of course being opened inasmuch as it is not connected to ground. Thus, the switch 14 is connected with the automatic terminal 16 and the resistor 9 has no influence on the automatic exposure time control operations. These operations go forward as described above in connection with FIG. 1.

Assuming now that the operator selects to provide for exposure-time control with the manual control means, but in the manual-mechanical range which includes the bulb exposure and the range of exposure times from 1/1000 to 1/60 seconds, then in this position of the parts the brushes B1 and B2 will have, for example the solid line positions indicated in FIG. 3. Now the brush B1 will bridge across and interconnect the inner strip (1) with that part of the strip (2) which is connected to the terminal 15, so that the circuitry of FIG. 1 is now set for the manual operation, and at this time the brush B2 bridges across and interconnectes the part of the strip (4) which is connected with the bulb contact with the grounded strip (3), so that the switch 24 is closed and the base of the transistor 25 is connected to ground at this time. Thus, at this time also the resistor 9 has an infinite resistance, and the closing of the switch 24 with the resultant connection of the base of transistor 25 to ground will assure that there will be no supply of current to the electromagnet 26. As is schematically illustrated in FIG. 3, by way of a suitable connection 42 the dial 40 will operate the mechanical timer 44 so as to provide in a known way a selected one of the exposure times in the manual-mechanical range.

On the other hand, if the operator selects for manual control of exposure time in the manual-electrical range, then the dial is turned so that the brushes B1 and B2 will assume positions as shown for example by the dot-dot-dash lines in FIG. 3. In the illustrated example the operator has selected an exposure time of ⅛ second. Thus it will be seen that while the brush B1 still connects the terminal 14 with the terminal 15, the brush B2 connects the strip 9a corresponding to the ⅛ second exposure time position with the ground connection provided by way of the strip (3). Thus it will be seen that at this time the switch 24 is opened inasmuch as the variable resistor 9 is operative to provide a manually selected exposure time in an electrical manner, the switch 24 of course being open at this time inasmuch as there is no connection with that part of a strip (4) which is connected with the bulb contact. Of course it will be understood that in the manual-mechanical range the structure shown in FIG. 3 will serve only to close the switch 24 so as to connect the base of transistor 25 to ground. The actual exposure time will be determined in a purely mechanical manner by a conventional timing mechanism which will provide one of the exposure times selected within the range 1/1000 to 1/60 second, depending upon the angular position of the dial which selects the particular exposure time.

Thus, in this way it is possible with the above-described structure of the invention to carry out the operations in such a way that the consumption of power by the electromagnet 26 is maintained at an absolute minimum while at the same time it is possible to indicate a desirable exposure time even during operation in the manual-mechanical range. Moreover with the arrangement of FIG. 3, the strips (3) and (4) serve as terminals for the conductor 9 and the switch 24 so that there is the advantage of reducing the space required for the structure as well as reducing the wiring and avoiding unnecessary consumption of battery power.

What is claimed is:

1. In a camera having an automatic exposure-time determining means which includes an electromagnet which is energized upon opening of a shutter of the camera to make an exposure and deenergized to close the shutter and terminate an exposure, the camera also having a manual exposure-time determining means including a manual-mechanical exposure-time range and a manual-electrical exposure-time range, and manually-operable means, including a single unit available to the operator to be manually moved to a selected one of a number of different positions including an automatic position, a plurality of manual-mechanical exposure-time positions, and a plurality of manual-electrical exposure-time positions, for setting the camera to make either an automatic determination of exposure time with said automatic means, when said unit is in said automatic position thereof, or a manual determination of exposure time in one of said ranges of said manual exposure-time determining means, when said unit is in a selected one of said plurality of manual-mechanical exposure-time positions or a selected one of said manual-electrical exposure-time positions, and electrical circuitry connected electrically with said electromagnet for controlling the energizing thereof, said electrical circuitry including a pair of parallel-connected switch means one of which is an automatic switch means and the other of which is a manual switch means, said automatic switch means cooperating, at all camera settings provided by said manually operable means, through said electrical circuitry with said electromagnet for assuming a position for energizing said electromagnet automatically by the time a shutter of the camera has opened, and said manual switch means being operatively connected with said manually operable means to be controlled thereby for preventing energizing of said electromagnet in said manual-mechanical range while having no influence on the control of the electromagnet in the manual-electrical range of said manual exposure-time determining means or when said manually operable means has been set to provide operation by said automatic exposure-time determining means, so that said electromagnet remains unenergized during the time when said manual switch means prevents energizing of said electromagnet in said manual-mechanical range, even though said automatic switch means assumes said position for energizing said electromagnet during the latter time.

2. The combination of claim 1 and wherein said electrical circuitry includes a computing means for automatically computing a proper exposure time according to factors of brightness, film speed, and diaphragm setting, and an indicating means for indicating the computed exposure time, and said computing means and indicating means being independent of said manual switch means so as to be uninfluenced thereby for computing and indicating an exposure time even when said manually operable means sets the camera to provide exposures in said manual-mechanical range.

3. The combination of claim 1 and wherein said manual-mechanical range of exposure times includes bulb exposure and a series of exposure times which are shorter than a series of exposure times which constitute said mechanical-electrical range.

4. The combination of claim 1 and wherein said electrical circuitry includes a trigger circuit for determining the instant of deenergizing of the electromagnet for terminating an exposure, a transistor connected between said trigger circuit and said electromagnet, said transistor having a base, and said parallel-connected pair of switch means being connected between the latter base and ground and each having a closed position for connecting the base of said transistor to ground in order to prevent energizing of the electromagnet means, said manually operable means automatically placing said manual switch means in said closed position thereof when said manually operable means is set for providing exposures in the manual-mechanical range while maintaining said manual switch means open at all other times so that during operation of said automatic exposure-time determining means and during operation of said manual exposure-time determining means in said manual-electrical range the energizing of the electromagnet is controlled by said automatic switch means.

5. The combination of claim 4 and wherein said manual switch means includes a pair of elongated electrically conductive strips situated beside but spaced from each other and one of which is grounded, and said unit of said manually operable means including a brush which bridges across and electrically interconnects said strips only when said manually operable means is set for providing manual determination of exposure time in a selected manual-mechanical position of said manual-mechanical range.

6. The combination of claim 5 and wherein said grounded electrically conductive strip extends beyond the other of said electrically conductive strips of said manual switch means, and a series of additional electrically conductive strips situated one after the other along said grounded strip beyond said other strip of said manual switch means in the manual-electrical range at substantially the same distance from said grounded strip as said other strip, and an elongated resistor connected electrically with said additional strips for providing different resistance values when said brush interconnects one of said additional strips with said grounded strip, said manually-operable means placing said brush in contact with one of said additional strips while maintaining said brush in contact with said grounded strip when selecting an exposure time in said manual-electrical range.

7. The combination of claim 6 and wherein a third electrically-conductive strip extends along said grounded strip at the side thereof opposite from said other electrically conductive strip of said manual switch means and said plurality of additional contact strips, said third strip being interrupted and having an automatic portion providing part of said automatic means for determining exposure time and an elongated manual portion for providing part of said manual means for determining exposure time, and a fourth electrically conductive strip extending along said third strip at the side thereof opposite from said grounded strip and forming a common electrical connection for a switch for selecting between automatic and manual determination of exposure, the latter switch including a second brush of said unit of said manually operable means to be moved thereby between one position bridging across and interconnecting said fourth strip with said automatic portion of said third strip and another position extending across and interconnecting said fourth strip with said manual portion of said third strip for respectively selecting automatic or manual determination of exposure time.

8. The combination of claim 7 and wherein all of said strips extend along concentric circular paths.

9. The combination of claim 8 and wherein said fourth strip has the smallest diameter while said third strip is situated next to said fourth strip with said grounded strip being situated between said third strip and said electrically conductive portion of said manual switch means as well as said series of additional contact strips.

* * * * *